United States Patent [19]

Morgan et al.

[11] Patent Number: 5,369,172
[45] Date of Patent: Nov. 29, 1994

[54] POLYMER BLEND WITH LOW GLOSS

[75] Inventors: Sarah E. Morgan, Evansville, Ind.; Charles F. Pratt, Brasschaat,

[73] Assignee: General Electric Company, Pittsfield, Mass.

[21] Appl. No.: 189,273

[22] Filed: Jan. 31, 1994

Related U.S. Application Data

[63] Continuation of Ser. No. 878,071, May 4, 1992, abandoned.

[30] Foreign Application Priority Data

Jun. 19, 1991 [EP] European Pat. Off. ......... 91110064.2

[51] Int. Cl.$^5$ ............................................. C08L 69/00
[52] U.S. Cl. ............................................ 525/67; 525/92; 525/133; 525/147; 525/148; 525/462; 525/463; 525/467
[58] Field of Search ............... 525/67, 92, 133, 147, 525/148

[56] References Cited

U.S. PATENT DOCUMENTS

| | | | |
|---|---|---|---|
| 4,788,252 | 11/1988 | de Boer | 525/148 |
| 4,853,458 | 8/1989 | Gambale et al. | 525/198 |
| 4,868,244 | 9/1989 | Boutni | 525/67 |
| 4,885,335 | 12/1989 | Gallucci | 525/148 |
| 4,885,336 | 12/1989 | Boutni et al. | 525/67 |
| 4,902,743 | 2/1990 | Boutni | 525/67 |
| 5,055,523 | 10/1991 | Inoue | 525/148 |
| 5,179,161 | 1/1993 | Saito | 525/133 |

FOREIGN PATENT DOCUMENTS

| | | |
|---|---|---|
| 269456 | 6/1988 | European Pat. Off. |
| 270809 | 6/1988 | European Pat. Off. |
| 0150926 | 7/1987 | Japan |

*Primary Examiner*—David Buttner

[57] ABSTRACT

The invention provides a low gloss polymer blend comprising an aromatic carbonate without reactive groups, a polymer or copolymer having a reactive epoxygroup and an aromatic carbonate polymer or copolymer having a reactive group which react with the epoxy group. Optionally, the composition may contain further usual compounds, such as polymeric materials which are normally used to modify the mechanical properties of polycarbonate, particularly rubbery or non-rubbery polymeric materials containing units of a styrene; also additives like colorants, flame retarding agents may be routinely incorporated.

10 Claims, No Drawings

POLYMER BLEND WITH LOW GLOSS

This is a continuation of copending application Ser. No. 07/878,071 filed on May 4, 1992, now abandoned.

The invention relates to a polymer blend comprising an aromatic carbonate polymer without reactive groups and further polymers or copolymers and having a low gloss.

Blends of aromatic carbonate polymers with various kinds of polymers or copolymers, particularly styrene units-containing polymers, are known and are used commercially on a large scale. Many of such blends have excellent physical and mechanical properties, but they possess a high gloss which constitutes a disadvantage for various uses, such as in the interior of automobiles.

U.S. Pat. Nos. 4,868,244, 4,885,336 en 4,902,743 describe blends containing an aromatic carbonate polymer and various other components. Said blends comprise specific gloss reducing additives like glycidyl (meth) acrylate polymers or an EPDM modified by reaction with an epoxy acrylate. According to U.S. Pat. No. 4,868,244 the addition of the gloss reducing additives alone i.e. without addition of an impact modifier, does not reduce gloss (col.10 lines 20–21). A further disadvantage of the known gloss reducing additives is that gloss reduction is still not great enough for specific applications and the blends also show processing instability.

EP-A-0269 456 describes polymer blends comprising a thermoplastic polycarbonate, a vinyl aromatic/alpha, beta- unsaturated carboxylic anhydride copolymer and an macromonomer/alkyl acrylate/glycidyl methacrylate terpolymer additive. The additive is said to improve the weld line strength.

JP-A-87/0150926 (see Derwent Abstract AN 89-042674) describes blends with improved impact resistance. The blends comprise an olefin type copolymer containing epoxy groups, an olefin type copolymer containing acid anhydride groups, a polycarbonate and a polyamide.

The invention is based on the discovery that by blending certain ingredients together a polymer blend can be obtained having low gloss.

It is speculated that by blending said ingredients, in particular by compounding in an extruder, a special structure is obtained which causes the low gloss.

The polymer blend comprises besides the aromatic polycarbonate without reactive groups (a), a polymer or copolymer having a reactive epoxygroup (b) and an aromatic carbonate polymer or copolymer having a reactive group which can react with the epoxygroup (c).

Polymer copolymer (b) has by preference more than one reactive epoxygroup per molecule.

Similarly polymer or copolymer (c) has by preference more than one reactive group per molecule.

Even more preferred both (co)polymer (b) and (co)polymer (c) each have more than one reactive group per molecule.

The composition of the polymer blend according to the invention is preferably such that it comprises 40–98% by weight of the aromatic polycarbonate (a), 1–30% by weight of the polymer a copolymer (b) and 1–30% by weight of the aromatic carbonate polymer or copolymer (c), calculated with respect to the sum of the quantities of (a), (b) and (c) together.

In the polymer blend according to the invention one can use as aromatic carbonate polymer an aromatic polycarbonate or polyestercarbonate or a block copolymer having blocks with carbonate linkages and blocks having siloxane units, or a block copolymer having aromatic carbonate blocks and aliphatic carbonate blocks or a blend of two or more of such compounds.

Polymer (b) can have a reactive epoxygroup which comes from a unit derived from glycidylacrylate or glycidylmethacrylate that has been incorporated in the polymer chain or which has been grafted there upon.

Polymer (c) comprises as reactive group that may react with the epoxy group by preference a carboxylic acid group, a carboxylic acid anhydride group, an amine group or an alcohol group.

Aromatic carbonate polymers provided with carboxylic acid groups have been proposed for blending with polyamids (EP-A-0270809).

The polymer blend may comprise further polymeric components. Such examples of such components are d) a graft copolymer obtained by grafting d(1) and d(2);
  d(1) styrene, alpha-methylstyrene, a styrene substituted in its nucleus, methylmethacrylate or blends thereof and
  d(2) (Meth) acrylonitrile, methylmethacrylate, maleic anhydride, N-substituted maleimide or blends thereof upon
  d(3) a rubbery latex
e) a copolymer of e(1) and e(2):
  e(1) styrene, alpha- methylstyrene, a styrene substituted in its nucleus, methylmethacrylate or blends thereof and
  e(2) (Meth)acrylonitrile, methylacrylate, maleic anhydride, N-substituted maleimide or blends thereof.

When the above mentioned components (d) and (e) are incorporated in the polymer blend according to the invention they are preferably incorporated in such quantities that the blend comprises d) 10–50 parts by weight of the graft copolymer and
e) 25–75 parts by weight of the copolymer, the quantities being calculated with respect to 100 parts by weight of (a), (b) and (c) together.

The blends according to the invention are preferably prepared by compounding the components in a melt-extruder.

The invention further relates to products made out of the polymer blend according to the invention.

The polymer blend according to the invention comprises at least a) an aromatic carbonate polymer without reactive groups;
b) a polymer or copolymer having a reactive epoxygroup and
c) an aromatic carbonate polymer a copolymer having a reactive group which can react with the epoxygroup.

a) An aromatic carbonate polymer without reactive groups.

Aromatic polycarbonates are materials known per se. They are generally prepared by reacting a dihydric phenol compound with a carbonate 5 precursor, for example, a halogen formiate or a carbonate ester. Aromatic poly carbonates are polymers which comprise units of the formula

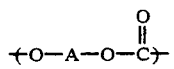

wherein A is a bivalent aromatic radical which is derived from the dihydric phenol used in the preparation of the polymer. Mononuclear or polynuclear aromatic compounds may be used as dihydric phenols in the preparation of the aromatic polycarbonates, which compounds comprise two hydroxy radicals each directly bonded to a carbon atom of an aromatic nucleus.

The known branched polycarbonates as described, for example, in U.S. Pat. No. 4,001,184 are also suitable.

Suitable aromatic polycarbonates are also the so-called polyester carbonates which are obtained by performing the polymerisation reaction in the presence of an ester precursor, for example, a difunctional carboxylic acid, for example, terephthalic acid or an ester-forming derivative thereof. These polyester carbonates comprise ester compounds and carbonate compounds in the polymeric chain. Polyester carbonates are described, for example, in U.S. Pat. No. 3,169,121.

Block copolymers with aromatic carbonate blocks and aliphatic carbonate blocks are also suitable.

b) Polymer or copolymer having reactive epoxy-group(s).

The exact nature of component (b) is not critical, the only requirements being that it contains at least one reactive epoxy group per molecule, and that it is sufficiently compatible with component (a).

The reactive epoxy group can be introduced in the polymer or copolymer (b) in any suitable way, such as by end capping or preferably by copolymerization or grafting. Particularly suitable monomers for these purposes are glycidyl acrylate and glycidyl methacrylate.

c) Aromatic carbonate polymer or copolymer having reactive group(s) which can react with the epoxy-group(s).

The above mentioned polymers or copolymers have a reactive group which can react with a reactive epoxy group. Suitable reactive groups are carboxylic acid groups, carboxylic acid anhydride groups, amine groups and alcoholgroups.

Suitable (co)polymers (c) are the functionalized polycarbonates as disclosed in U.S. Pat. No. 4,853,458 and in EP-A-0270809.

U.S. Pat. No. 4,853,458 deals with carboxy functionalised polycarbonates which have been prepared by incorporating a carboxylic acid-substituted phenol, like for example t-butyl p-hydroxybenzoate as a chain stopper in the polycarbonate-forming reaction. It is known that the so obtained products are capable of forming copolymers with other polymers such as polyamides and functionalized olefin polymers by generation of a carboxygroup which reacts therewith.

EP-A-0270809 describes polycarbonates with reactive groups which have been introduced by reacting a hydroxy-terminated form of the polycarbonate with a functionalizing agent. The functionalizing agent can be an aliphatic or aromatic diacid or polyacid such as 1,2,3-benzene tricarboxylic acid or 1,2,3-benzene tetra carboxylic acid. Ester derivates or anhydrides of diacids and polyacids are also suitable.

Preferably at least one of the polymers (b) or (c) contain more than one reactive group per molecule.

Apart from the above-discussed components the compositions of this invention may contain further polymeric materials, such as those which are already known in combinations with polycarbonates. Some examples are crystal clear polystyrene, high impact polystyrene (HIPS), rubbery copolymers of styrene, graft copolymers, and also copolymers and graft copolymers of other (un)saturated compounds.

Some examples of suitable graft copolymers are graft copolymers obtained by grafting (1) styrene, a-methylstyrene, a styrene substituted in the nucleus, methylmethacrylate or mixtures thereof, and (2) acrylonitrile, methacrylonitrile, methylmethacrylate, maleic anhydride, N-substituted maleimides or blends thereof on (3) a rubbery latex. Examples of ungrafted copolymers are copolymers from (1) styrene, a-methylstyrene, a styrene substituted in the nucleus, methylmethacrylate or mixtures thereof with (2) acrylonitrile, methacrylonitrile, methylacrylate, maleic anhydride, N-substituted maleimides or mixtures thereof.

Polymer blends according to the invention comprising in addition to components (a), (b) and (c) either styrene-acrylonitrile copolymer in combination with an impact modifier, or cristal clear polystyrene in combination with an impact modifier, or a high impact polystyrene show a high flow, low gloss and good impact strength which make these compositions eminently suitable for automobile interiors (e.g. the dashboard) and in the production of office machines.

Several other uses for the combinations of the present invention will be obvious to the expert. Also it will be obvious that, depending on the end use, various usual additives can be incorporated in the present compositions, such as for example colorants, flame retardant agents etc.

The polymer blends according to the invention can be prepared according to all known techniques for preparing polymeric blends. A preferred method consists in compounding the components in a melt extruder.

The invention is further illustrated by the following non limiting examples.

In the examples the following abbreviations have been used to indicate the components utilized for preparing the blends:

PC: an aromatic polycarbonate derived from bisphenol A and phosgene with an intrinsic viscosity of 54 ml/g as measured in $CH_2Cl_2$ at 23° C., without any reactive groups.

PC-COOH an aromatic polycarbonate end-capped with COOH groups obtained in accordance with EP-A-312 811 with about two reactive groups per molecule.

PEC: a carbonate polymer with aromatic carbonate blocks, derived from bisphenol A and phosgene and with aliphatic carbonate blocks derived from an aliphatic dicarboxylic acid and phosgene with a ratio of by weight of aromatic blocks to aliphatic blocks of about 90:10, without any reactive groups.

PS:crystal clear polystyrene with a molecular weight of 300.000, without any reactive group.

PS-GMA-1: a copolymer of styrene and 1% by weight glycidylmethacrylate (GMA), with about 5–15 reactive groups per molecule.

PS-GMA-3: a copolymer of styrene and 3% by weight glycidylmethacrylate (GMA), with about 15–45 reactive groups per molecule.

PS-GMA-8: a copolymer of styrene and 8% by weight glycidylmethacrylate (GMA), with about 40–120 reactive groups per molecule.

SAN-GMA-1: a terpolymer of 84% by weight styrene, 15% by weight acrylonitrile and approximately 1% by weight GMA, with about 5-15 reactive groups per molecule.

ABS: a graft copolymer consisting for 50% by weight of a butadiene rubbery backbone where upon 22% by weight acrylonitrile and 78% by weight of styrene have been grafted, without reactive groups.

SAN : a styrene - acrylonitrile copolymer with a styrene content of about 72% by weight, with a molecular weight of about 100,000 without reactive groups.

EXAMPLE 1—Low gloss blends containing no rubbers

The most surprising result of these experiments is that ultra low gloss aromatic carbonate polymer based blends are obtained simply by adding reactive polymers. No rubbers or fillers of any kind are necessary.

The following blends were prepared by first mixing all polymeric components and then extruding through a melt-extruder at a melt temperature of 260°–270° C. Samples were injection molded on an injection molding machine. Gloss was measured on injection molded samples at an angle of 60 and 85 degrees. (according to ASTM D523).

Blend compositions and gloss values are given in Table A. Formulation No. 1 contains no reactive components and demonstrates high gloss. When two co-reactive components are added, PC-COOH+SAN-GMA-1 (Formulation no. 2), gloss is dramatically reduced at both 60 and 85 degree measuring angle.

TABLE A

| | Low gloss PC Blends without Rubbers Formulation Weight Percent Component | | | | |
|---|---|---|---|---|---|
| | PC | PC-COOH | SAN-GMA-1 | Gloss | |
| No. | (a) PS | (c) | (b) | 60° | 85° |
| 1 | 90 10 | — | — | 94 | 91 |
| 2 | 80 — | 10 | 10 | 30 | 74 |

EXAMPLE 2—PC/ABS Blends with PC-COOH and various GMA-containing copolymers

Table B shows gloss values for blends containing PC-COOH in combination with PS-GMA (formulation no. 2, 3) and SAN-GMA (formulation no. 4) copolymers in comparison to a standard blend containing no functionalized copolymers (formulation no. 1). Each functionalized blend contains ten weight percent of the GMA-copolymer and ten weight percent of the PC-COOH. All the blends containing reactive components show markedly reduced gloss in comparison to the standard, but blend formulation no. 4 shows the greatest reduction in gloss. Thus, gloss is affected by the nature of the functionalized copolymers, and for a given concentration of reactive polymer additives gloss level may be optimized by selecting the optimal functional copolymer.

TABLE B

| Blend | Formulation no. | | | |
|---|---|---|---|---|
| Component (% by weight) | 1 | 2 | 3 | 4 |
| PC (a) | 57 | 47 | 47 | 47 |
| ABS (d) | 18 | 18 | 18 | 18 |
| SAN (e) | 25 | 15 | 15 | 15 |
| PC-COOH (c) | — | 10 | 10 | 10 |
| PS-GMA-3 (b) | — | 10 | — | — |
| PS-GMA-8 (b) | — | — | 10 | — |
| SAN-GMA-1 (b) | — | — | — | 10 |
| Gloss | | | | |
| 60° | 95 | 45 | 37 | 23 |
| 85° | 99 | 92 | 88 | 68 |

EXAMPLE 3—Low Gloss blends of PEC/ABS.

In Table C gloss of PEC/ABS blends with varying amounts of PC-COOH in combination with SAN-GMA-1 is shown. Again, all blends with two functionalized (co)polymers (formulations no. 2,3,4) show lower gloss than the standard which contains no functionalized copolymers (formulation no. 1). Gloss level varies, however, with the amount of functionalized copolymers added. For a given combination of functionalized copolymers, then, gloss level may be optimized by optimizing functionalized copolymer concentration.

TABLE C

| Blend | Formulation no. | | | |
|---|---|---|---|---|
| Component (% by weight) | 1 | 2 | 3 | 4 |
| PEC | 72 | 52 | 62 | 52 |
| ABS | 12 | 12 | 12 | 12 |
| SAN | 16 | 11 | 6 | — |
| PC-COOH | — | 20 | 10 | 20 |
| SAN-GMA-1 | — | 5 | 10 | 16 |
| Gloss | | | | |
| 60° | 80 | 34 | 16 | 15 |
| 85° | 97 | 86 | 60 | 58 |

All patent (applications) mentioned herein are herewith incorporated by reference.

We claim:
1. A polymer blend comprising:
   (a) an aromatic carbonate polymer without a carboxylic acid group, carboxylic acid anhydride group, amine group or alcohol group;
   (b) a polymer or copolymer having a reactive epoxy group; and
   (c) an aromatic carbonate polymer or copolymer having a reactive group selected from the group of carboxylic acid groups, carboxylic acid anhydride groups, amine groups, alcohol groups or a mixture thereof further comprising one or more of the following types of ingredients:
   d) a graft copolymer obtained by grafting d(1) and d(2);
      d(1) styrene, alpha-methylstyrene, a styrene substituted in its nucleus, methylmethacrylate or blends thereof and
      d(2) (meth) acrylonitrile, methylmethacrylate, maleic anhydride, N-substituted maleinimid or blends thereof upon
      d(3) a rubbery latex and/or
   e) a copolymer of e(1) and e(2);
      e(1) styrene, alpha-methylstyrene, a styrene substituted in its nucleus, methylmethacrylate or blends thereof and
      e(2) (meth) acrylonitrile, methylacrylate, maleic anhydride, N-substituted maleimide or blends thereof.

2. Polymer blend according to claim 1, wherein the polymer or copolymer (b) has more than one reactive epoxygroup per molecule.

3. Polymer blend according to claim 1, wherein the polymer or copolymer (c) has more than one reactive group per molecule.

4. Polymer blend according to claim 1, wherein the polymer or copolymer (b) has more than one reactive epoxygroup and the polymer or copolymer (c) has more than one reactive group per molecule.

5. Polymer blend according to claim 1, comprising 40–98% by weight of the aromatic polycarbonate (a), 1–30% by weight of the polymer a copolymer (b) and 1–30% by weight of the polymer or copolymer (c), calculated with respect to the sum of the quantities of (a), (b) and (c) together.

6. Polymer blend according to claim 1, wherein the aromatic carbonate polymer (a) is selected from the group of aromatic polycarbonates, polyestercarbonates, block copolymers having blocks with carbonate linkages and blocks having siloxane units, block copolymers having aromatic carbonate blocks and aliphatic carbonate blocks, or a mixture, of two or more of such compounds.

7. Polymer blend according to claim 1, wherein the reactive epoxygroup consists of a unit derived from glycidyl (meth)acrylate which has been incorporated in the polymer chain or which has been grafted upon the polymer chain.

8. Polymer blend according to claim 1, wherein the blend comprises:
   d) 10–50 parts by weight of the graft copolymer and
   e) 25–75 parts by weight of the copolymer,
the quantities being calculated with respect to 100 parts by weight of (a), (b) and (c) together.

9. Process for preparing the blend according to claim 1, wherein the components are compounded in a melt extruder.

10. Objects made out of the blend according to claim 1.

* * * * *

UNITED STATES PATENT AND TRADEMARK OFFICE
CERTIFICATE OF CORRECTION

PATENT NO. : 5,369,172
DATED : November 29, 1994
INVENTOR(S) : Sarah E. Morgan; Charles F. Pratt; Hermannus B. Savenije It is certified that error appears in the above-indentified patent and that said Letters Patent is hereby corrected as shown below:

On the title page, item [75], after "Brasschaat", insert
--Belgium; Hermannus B. Savenije, Netherlands--.

Signed and Sealed this

First Day of October, 1996

Attest:

BRUCE LEHMAN

Attesting Officer  Commissioner of Patents and Trademarks